United States Patent [19]

Sime

[11] Patent Number: 5,386,104
[45] Date of Patent: Jan. 31, 1995

[54] SYSTEM AND METHOD FOR DETECTING USER FRAUD IN AUTOMATED TELLER MACHINE TRANSACTIONS

[75] Inventor: Iain R. F. Sime, Tayside, Scotland

[73] Assignee: NCR Corporation, Dayton, Ohio

[21] Appl. No.: 173,035

[22] Filed: Dec. 27, 1993

[30] Foreign Application Priority Data

Nov. 8, 1993 [GB] United Kingdom ............... 9323489

[51] Int. Cl.⁶ .............................................. G06F 15/30
[52] U.S. Cl. ..................... 235/379; 235/380;
235/382; 235/438; 902/3; 902/31; 902/5;
340/825.31; 340/825.34
[58] Field of Search ............ 235/379, 380, 382, 382.5,
235/438, 457; 902/3, 5, 31, 32, 10; 382/3, 4, 13;
340/825.3, 825.31, 825.34, 825.35; 364/408;
359/2

[56] References Cited

U.S. PATENT DOCUMENTS

| | | | |
|---|---|---|---|
| 4,439,670 | 3/1984 | Basset et al. | 235/382 |
| 4,598,367 | 7/1986 | DeFrancesco et al. | 364/408 |
| 4,621,326 | 11/1986 | Rawlins | 235/379 X |
| 4,621,334 | 11/1986 | Garcia | 340/825.3 |
| 5,012,076 | 4/1991 | Yoshida | 235/379 |
| 5,056,141 | 10/1991 | Dyke | 380/25 |
| 5,148,365 | 9/1992 | Dembo | 364/402 |
| 5,229,764 | 7/1993 | Matchett et al. | 340/825.34 |
| 5,239,166 | 8/1993 | Graves | 235/380 |
| 5,276,617 | 1/1994 | Hiroya et al. | 235/379 X |

FOREIGN PATENT DOCUMENTS

| | | | | |
|---|---|---|---|---|
| 3-33992 | 2/1991 | Japan | | 902/3 |
| 3-168892 | 7/1991 | Japan | | 235/379 |

OTHER PUBLICATIONS

"electronic banking 1", by Ronald Brown, published by POST–NEWS, Stoke–sub–Hamdon, Somerset, TA14 6BR, England, Copyright 1991 POST NEWS.

Primary Examiner—Donald Hajec
Assistant Examiner—Esther H. Chin
Attorney, Agent, or Firm—Albert L. Sessler, Jr.

[57] ABSTRACT

A self-service automated teller system includes a fraud detection module which uses a biometric recognition technique, such as voice or fingerprint recognition, in combination with predictive technology. The biometric recognition test is normally decisive, but if this test produces a result which is close to a predetermined threshold, the predictive technology checks to determine whether the transaction is consistent with the user's normal behavior before permitting the transaction to proceed. A suspicion count may also be included in the decision-making process, to determine whether or not the user has a previous record of suspicious transactions.

34 Claims, 2 Drawing Sheets

SYSTEM AND METHOD FOR DETECTING USER FRAUD IN AUTOMATED TELLER MACHINE TRANSACTIONS

CROSS-REFERENCE TO RELATED APPLICATION

Self Service System Having Predictive Capability and Method of Using, U.S. patent application Ser. No. 08/151,648, filed Nov. 15, 1993, inventors Michael G. Coutts et al.

BACKGROUND OF THE INVENTION

The present invention relates to a self-service business system.

Fraudulent use of self-service business systems such as automated teller machine (ATM) systems has become a substantial problem for banks and other financial institutions. Customer complaints have been received that "phantom withdrawals" have been made from their accounts by persons passing themselves off as the customers.

In an attempt to reduce the likelihood of fraud occurring, it is known to use biometrics for confirmation of user identity in a self-service system. Biometrics relates to the analysis of biological observations and phenomena. More particularly, in the present context, it relates to the measurement and evaluation of certain physical characteristics which vary from person to person. Biometric identification systems have been developed and are in use today. One such system is disclosed in U.S. Pat. No. 5,229,764, issued Jul. 20, 1993, inventors Noel D. Matchett et al., entitled "Continuous Biometric Authentication Matrix". The publication "Electronic Banking 1", published by "POST-NEWS", Stoke-sub-Hamdon, Somerset TA14 6BR England, Copyright 1991, discusses the use of biometrics in connection with electronic banking and identifies five types of biometric identification: signature verification, hand geometry, finger and palm print comparison, voiceprint measurement and retinal or iris eye scanning. A sixth type, vein patterns, is identified as having recently been designed. When a biometric assessment is made, a value is calculated for each user. This value is compared with a predefined reference value to decide whether to accept or reject a user. The use of biometrics to confirm the identity of a user is not always completely accurate. Because of the limitations of the technique, there is always a false acceptance rate and a false reject rate. Even though these rates usually lie within the range of 0.1% and 3%, depending upon the biometric used, this can still be unacceptable for banks.

SUMMARY OF THE INVENTION

According to the invention there is provided a self-service system including a user interface unit having user identification means, input means operable by a user for initiating a selected self-service transaction, and biometric means for producing biometric output data relating to a user; and storage means for storing biometric reference data relating to a plurality of authorized users of the system, characterized in that said storage means is arranged to store data relating to previous transactions initiated by said authorized users, and in that said system includes prediction means coupled to said identification means and arranged to predict the type of transaction to be requested by a given user on the basis of the stored data relating to previous transactions, and transaction authorization means coupled to said biometric means and to said prediction means and arranged to make a determination as to whether a transaction requested by a user is to be permitted to proceed to completion, said determination being made on the basis of a comparison between said biometric output data and said biometric reference data for the relevant user, and on the basis of a comparison between the transaction predicted for, and the transaction actually requested by, the relevant user.

It should be understood that, in a self-service system in accordance with the present invention, if a biometric test is not conclusive, use of the predictive means can be helpful in resolving the identity of the user. The prediction means involves the use of prediction to determine whether or not a proposed transaction is consistent with the user's normal behaviour in deciding whether to permit the transaction to proceed. The use of predictive technology is disclosed in the cross-referenced related patent application cited above, Ser. No. 08/151,648. A record of past transactions for each user is maintained and stored in a memory in the system. When a user commences a transaction, the system can predict what type of transaction the user is likely to request. In the case in which the biometric evaluation is questionable, the added information with respect to whether the type of transaction selected by the user is consistent with past actions can tip the scales for or against user acceptance.

Another factor which can be employed in determining whether a requested transaction may proceed to completion is a suspicion count. If a predetermined number of consecutive suspicious transactions involving a particular user have taken place, this can be determinative of user rejection in close cases. A suspicion count for each user is maintained in memory and is incremented for each suspicious transaction. The count is decremented to a start value (e.g. zero) whenever a non-suspicious transaction involving that user takes place.

It is accordingly an object of the present invention to provide a self-service system having an improved capability of detecting attempted fraud.

Another object is to provide a system for detecting user fraud in connection with ATM transactions using biometric and predictive techniques.

Another object is to provide a user ATM fraud detection system employing biometric and predictive techniques, together with the use of a suspicion count which maintains a record of previous suspicious transactions by that user.

Another object is to provide a method for detecting user fraud in connection with ATM transactions.

Another object is to provide an ATM user fraud detection method employing biometric and predictive techniques.

Another object is to provide an ATM user fraud detection method employing biometric and predictive techniques, together with the use of a suspicion count.

Additional benefits and advantages of the present invention will become apparent to those skilled in the art to which this invention relates from the subsequent description of the preferred embodiment and the appended claims, taken in conjunction with the accompanying drawings.

DETAILED DESCRIPTION

Figure 1:
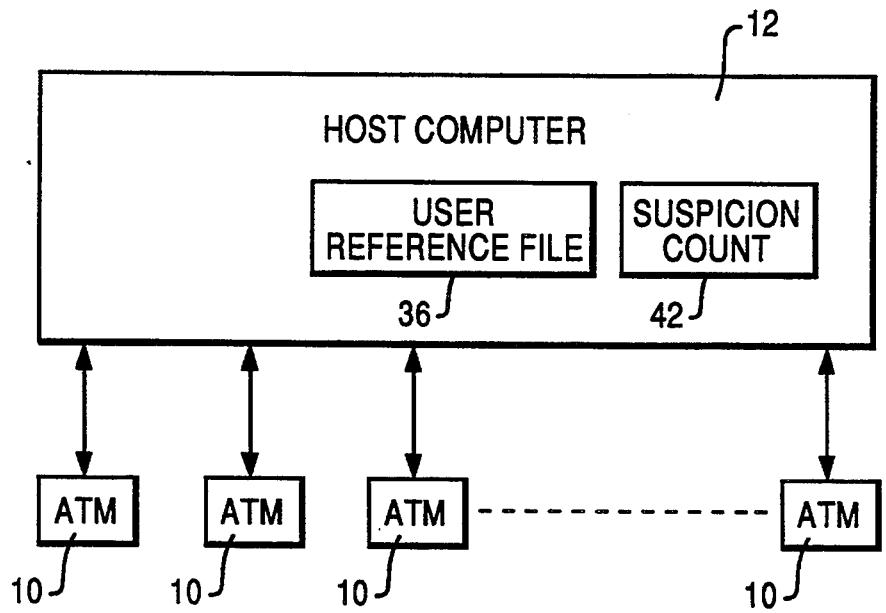
FIG. 1 is a block diagram of a self-service system in accordance with the invention incorporating a plurality of ATMs.
Figure 2:
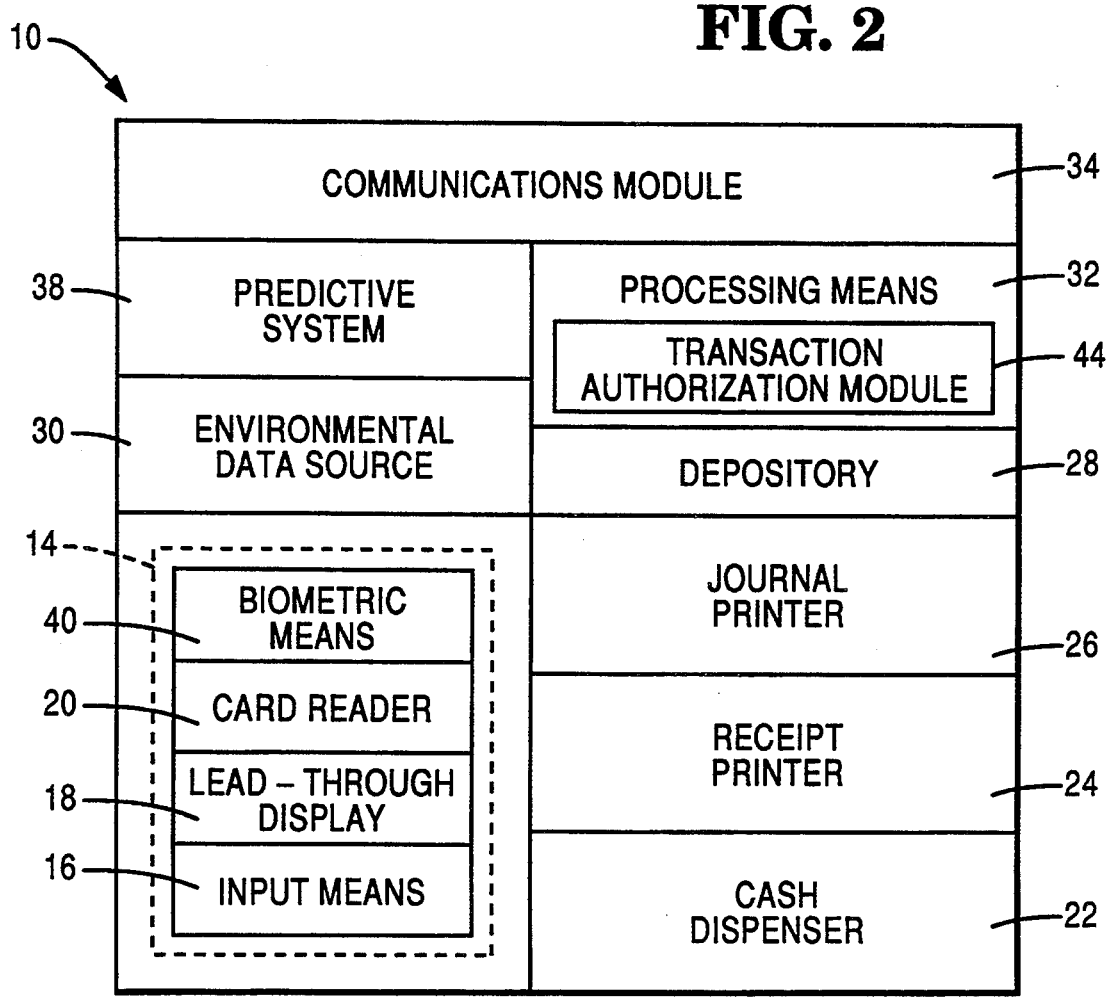
FIG. 2 is a schematic diagram of one of the ATMs of FIG. 1.

Referring to FIGS. 1 and 2, the self-service business system shown therein includes a plurality of ATMs 10 connected in conventional manner to a host computer 12. As shown in FIG. 2, each ATM 10 includes a conventional user interface unit or fascia 14 incorporating key operated input means 16 for enabling a user of the ATM 10 to enter, if required, a personal identification number (PIN) and to select desired services provided by the ATM 10, a lead-through display screen 18 for indicating to the user the options available to him in carrying out a transaction on the ATM 10 and for indicating the keys of the input means 16 which require to be operated in order to select a desired service or services, and a card reader 20 for reading account information contained on an identification card which the user inserts in operation into a slot (not shown) forming part of the card reader 20 whereby the user can be identified. Other conventional modules included in each ATM 10 include a cash dispenser 22 for counting and presenting currency notes to a user, a receipt printer 24 for printing receipts to be presented to a user when a deposit or cash withdrawal is made using the ATM 10 and for printing a mini-statement or balance of account statement when requested by a user, a journal printer 26 for printing a record of transactions carried out by the ATM 10, a depository 28 for receiving envelopes containing cash and/or checks deposited by a user, environmental data source means 30 for providing data as to the time and date of a transaction together with the location of the ATM 10, processing means 32 for controlling the operations of the various elements of the ATM 10, and a communications module 34 for coupling the ATM 10 to the host computer 12.

The host computer 12 includes a user reference file 36 which includes records of the types of transactions performed by authorized users in previous uses of the system which includes the various ATMs 10, environmental data relating to these transactions, and biometric reference data for each authorized use.

Also included in each ATM 10 is a predictive system 38 which is arranged to use the information contained in the user reference file 36 for a particular user to ascertain what service or services have been requested most frequently by that user at particular times, dates and locations in the past, and therefore what service or services are most likely to be requested by that user when he next initiates a transaction by inserting his identification card into the card reader 20 of one of the ATMs 10. The processing means 32 of each ATM 10 acts in dependence on the output of the predictive system 38 to cause the ATM 10 to perform certain operations at certain times and in certain sequences in order to cause the ATM 10 to complete a transaction with greater overall speed, and to simplify the decisions and selections which need to be made by the user, if the service or services actually requested is or are the same as the service, or at least some of the services, which have been predicted. Thus, the processing means 32 causes a particular menu to be displayed on the lead-through display screen 18 following initiation of a transaction by a user and following a prediction that particular services are likely to be requested by the user. For example, a simplified menu could be displayed consisting of only four questions, such as: "Do you require $20?", "Do you require $30?", "Do you require a mini-statement?", and "Do you require some other transaction?". Also, immediately following the initiation of a transaction, the ATM 10 could obtain system authorization for, and count out ready for presenting to the owner, a predicted amount of cash in advance of an anticipated withdrawal request. If, for example, a withdrawal request is predicted to be either $20 or $30, then $20 will be counted out since, if $30 is actually requested, a further $10 can readily be counted and added to the already counted amount.

Also included in the user interface unit 14 of each ATM 10 is a biometric means 40 which receives one or more biometric inputs from a user who is addressing the ATM 10. As has previously been set forth, the biometric information required may include one or more of several types, such as, for example, signature verification, hand geometry, finger and palm print comparison, voiceprint measurement, retinal or iris eye scanning or vein pattern determination. The particular input apparatus will vary in accordance with the particular biometric employed. For example, for voiceprint measurement, a microphone would customarily be used; for signature verification, a pressure-sensitive writing platform might be employed; for hand geometry, a platform on which the customer's hand is placed and sensed could be used, etc. Output data from the biometric means 40 is compared with the biometric reference data on file in the user reference file 36. As a result of this comparison, a first value is derived representative of the difference between the output data and the reference data. The output data is considered to be a conclusive match with the reference data if the first value is less than a predetermined threshold value.

Included in storage in the memory unit 42 of the host computer 12 is a suspicion count 42. This is a count of the number of consecutive suspicious transactions performed by a user. A suspicious transaction is one in which output data from the biometric means 40 fails to match conclusively the reference biometric data for the relevant user but lies within a predetermined limit of discrepancy. Each time that a suspicious transaction takes place, the total of the suspicion count is incremented by one. On the other hand, when a non-suspicious transaction is completed by a user, the suspicion count is decremented to zero. A suspicion count threshold number, either for a particular user or for all users, may be determined and stored in the host computer 12, for example, in the user reference file 36.

Also included in each ATM 10 is a transaction authorization module 44, which is a software module that is integrated into the processing means 32 which controls the operation of the ATM 10, the module 44 serving to authorize a transaction selected by a user. The inputs to the transaction authorization module 44 are as follows: the predicted transaction; the actual requested transaction; the biometric reference value; and any previously recorded suspicion count. The outputs from the transaction authorization module are: OK, meaning that the identity of the user has been confirmed and that the user can proceed with the transaction; failed, meaning that the biometric test has not confirmed the identity of the user as read from his identification card, thereby implying that an attempted fraud is taking place; and suspicious, meaning that the module 44 cannot be 100% sure either way. In the last instance, the suspicion count in the memory unit 42 is incremented by one, so that the system is aware of a possible attempted fraud. It should be understood that if the suspicion count reaches a predetermined threshold value (typically 3) then the module 44 terminates the transaction.

Figure 3:
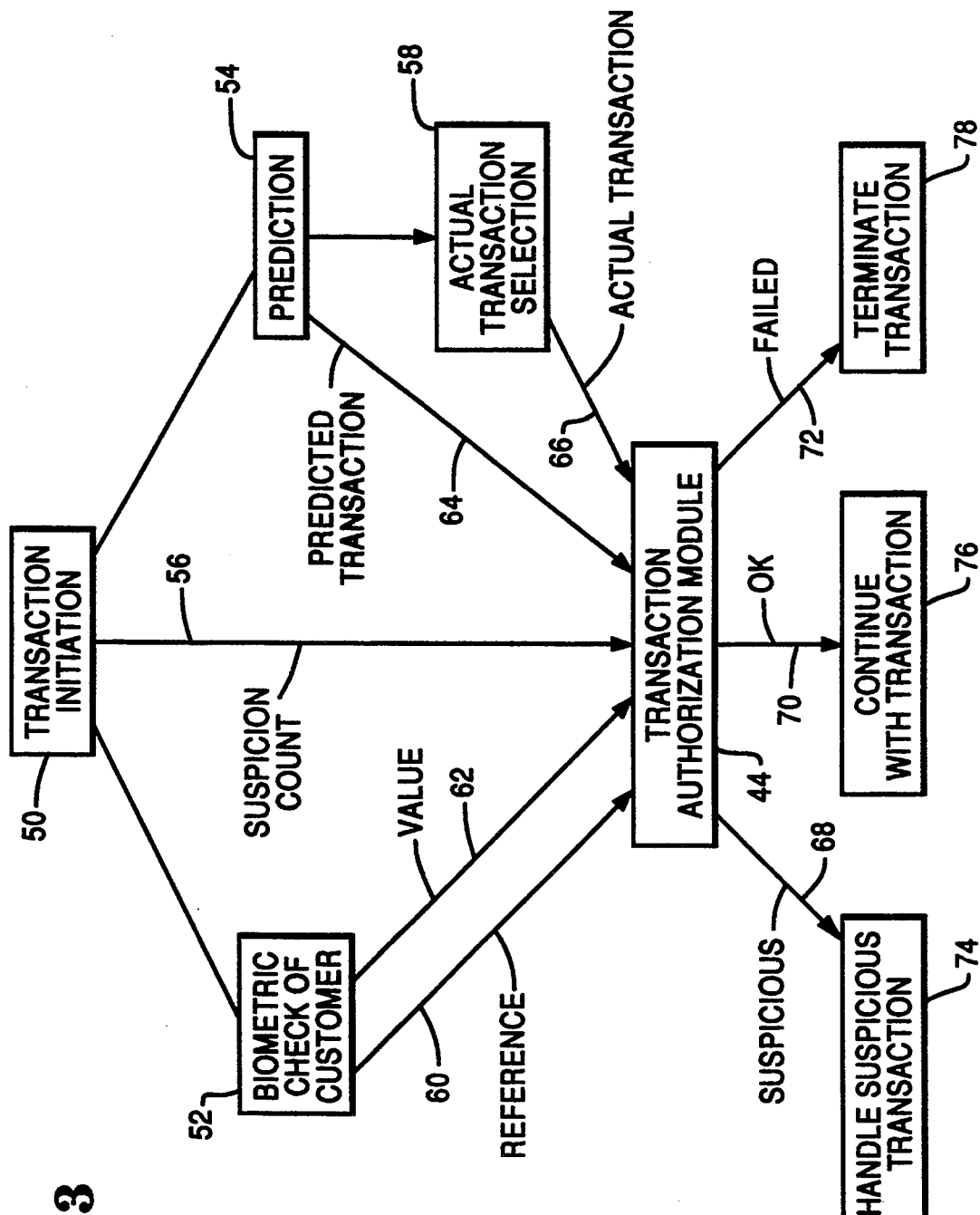
FIG. 3 is a flow diagram illustrating the operation of the transaction authorization means of the system.

The operation of the self-service system, particularly as regards the transaction authorization process, will now be described with reference to FIG. 3. A transaction is initiated by a user inserting his identification card into the card reader 20 of one of the ATMs 10. After a transaction is initiated, a biometric check of the user is made (block 52) and simultaneously a prediction is made (block 54) as to the service or services that will probably be requested by the user. At the same time, a suspicion count, if there is one for that user, is forwarded by a path 56 to the transaction authorization module 44. The user then makes an actual transaction selection (block 58). All of the information from these actions is input to the module 44, as represented by a biometric reference path 60, a biometric value path 62, the suspicion count path 56, a predicted transaction path 64 and an actual transaction path 66. The module 44 then processes all of this information and provides a decision. The various alternatives are represented in FIG. 3 by paths 68, 70 and 72, shown as outputs from the module 44, which lead to blocks 74, 76 and 78, respectively.

It should be understood that if the biometric value is a conclusive match with the reference value then the transaction continues (block 76) regardless of whether the actual transaction is as predicted.

Also, if the biometric value clearly fails, then the transaction is found not to be valid by the module 44 regardless of whether the actual transaction is as predicted. In this case the transaction is terminated (block 78) and the suspicion count is incremented. Another option in the case of an invalid transaction is to arrange for the relevant ATM 10 to capture the user's identification card.

If the biometric value is close to the biometric reference value (i.e. is not a conclusive match but matches the reference value within a predetermined limit of discrepancy) and the actual transaction is as predicted, then the module 44 increments the suspicion count and permits the transaction to proceed to completion provided that the suspicion count has not reached the threshold value. If the biometric value is close to the reference value but the actual transaction is not as predicted, the suspicion count is incremented and appropriate further action is taken (block 74) to handle a suspicious transaction, again provided that the suspicion count has not reached the threshold value. This further action may involve repeating the biometric check, making a different biometric check or requiring the user to enter his PIN on the ATM input means 16. If the further biometric check is conclusive or the entered PIN is correct then the transaction is allowed to proceed. On the other hand, if the further biometric check is not conclusive or the PIN is incorrect then the transaction is terminated.

In an alternative embodiment of a self-service system in accordance with the invention, instead of storing a user reference file in the host computer 12, a data base containing a record of a user's previous transactions and biometric reference data could be stored in the identification card for that user, this data being read out at the same time as the identification data for the user. Also, the suspicion count for the user could be stored in the identification card.

Although the invention has been described with particular reference to a preferred embodiment thereof, variations and modifications of the present invention can be effected within the spirit and scope of the following claims.

What is claimed is:

1. A system for detecting user fraud in connection with automated teller machine transactions, comprising:
    means for measuring at least one biometric value for a user;
    means for comparing that value to a reference biometric value for that user;
    means for predicting the type of transaction to be requested by said user;
    means for comparing the predicted transaction with the transaction actually requested by said user; and
    means for determining whether the user is valid, based upon the biometric value comparison and the result of comparing the predicted transaction with the actual transaction if said biometric value comparison is not conclusive.

2. The system of claim 1, also including means for maintaining a suspicion count of suspicious transactions involving said user, threshold means for establishing a maximum threshold number of suspicious transactions, and comparison means for comparing the number of suspicious transactions with the threshold number and conveying the result of the comparison to said means for determining whether the user is valid.

3. The system of claim 1, in which said means for determining whether the user is valid includes means for comparing the difference between the biometric value of the user and the reference biometric value with a threshold biometric value.

4. The system of claim 2, in which said means for determining whether the user is valid comprises a user transaction authorization module having inputs which include the following: biometric user value; biometric reference value; suspicion count; type of predicted transaction; and type of actual transaction.

5. The system of claim 4, in which said user transaction authorization module can, depending upon the various inputs, either continue with a user transaction, terminate a user transaction, or obtain further information concerning the user before making a final determination.

6. The system of claim 5, in which said user transaction authorization module can increment the suspicion count when user validity is questionable.

7. The system of claim 1, in which the means for measuring at least one biometric value comprises signature verification measuring means.

8. The system of claim 1, in which the means for measuring at least one biometric value comprises hand geometry measuring means.

9. The system of claim 1, in which the means for measuring at least one biometric value comprises finger print comparison.

10. The system of claim 1, in which the means for measuring at least one biometric value comprises palm print comparison.

11. The system of claim 1, in which the means for measuring at least one biometric value comprises voiceprint measurement.

12. The system of claim 1, in which the means for measuring at least one biometric value comprises retinal eye scanning.

13. The system of claim 1, in which the means for measuring at least one biometric value comprises iris eye scanning.

14. The system of claim 1, in which the means for measuring at least one biometric value comprises vein pattern determination.

15. The system of claim 1, in which said system includes a host computer and a plurality of automated teller machines.

16. The system of claim 15, in which said host computer includes a user reference file which maintains predicted transaction and biometric value reference files for each user.

17. The system of claim 16, in which said host computer also includes a suspicion count which maintains a record of the number of suspicious transactions for each user.

18. A self-service system comprising:
a user interface unit having user identification means;
input means operable by a user for initiating a selected self-service transaction;
biometric means for producing biometric output data relating to a user;
storage means for storing biometric reference data relating to a plurality of authorized users of the system, said storage means being arranged to store data relating to previous transactions initiated by said authorized users;
prediction means coupled to said identification means and arranged to predict the type of transaction to be requested by a given user on the basis of the stored data relating to previous transactions; and
transaction authorization means coupled to said biometric means and to said prediction means and arranged to make a determination as to whether a transaction initiated by a user is to be permitted to proceed to completion, said determination being made on the basis of a comparison between said biometric output data and said biometric reference data for the relevant user, and, if said biometric comparison is not conclusive on the basis of a comparison between the transaction predicted for, and the transaction actually requested by, the relevant user.

19. The system of claim 18, in which said transaction authorization means is arranged to allow a transaction to proceed if said biometric output data conclusively matches said biometric reference data, regardless of the comparison between the predicted and requested transaction, but that if said biometric output data does not conclusively match said biometric reference data but does match said reference data within a predetermined limit of discrepancy then the comparison between the predicted and requested transaction is used in determining whether the transaction is permitted to proceed to completion.

20. The system of claim 19, in which a first value is derived representative of the difference between said biometric output data and said biometric reference data, said output data being considered to be a conclusive match with said reference data if said first value is less than a predetermined threshold value.

21. The system of claim 19, in which, if said biometric output data does not conclusively match said biometric reference data but does match said reference data within said predetermined limit, and said requested transaction is not consistent with said predicted transaction, said transaction authorization means is arranged to obtain additional information concerning the relevant user before a final determination is made as to whether the transaction is permitted to proceed to completion.

22. The system of claim 21, in which, in the course of transaction, a further use is made of said biometric means provide said additional information.

23. The system of claim 21, in which, in the course of a transaction, the user enters a personal identification number by means of said input means to provide additional information.

24. The system of claim 19, also including further storage means arranged to store a suspicion count for each of said authorized users, each suspicion count being arranged to be incremented by one each time said biometric output data for the relevant user is not a conclusive match with said biometric reference data for that user, but being reset to a start value each time said output data is a conclusive match with said reference data, said transaction authorization means being arranged to terminate a transaction if said suspicion count reaches a predetermined threshold value.

25. The system of claim 18, in which said user identification means comprises a card reader for reading from a card account information relating to a user.

26. The system of claim 18, in which the stored data relating to previous transactions is updated each time a transaction is initiated by one of said authorized users.

27. The system of claim 18, also including a host computer and a plurality of automated teller machines, each including a user interface unit, prediction means and authorization means as called for in claim 18.

28. A method for detecting user fraud in connection with automated teller machine transactions, comprising the following steps:
(a) measuring at least one biometric value for a user;
(b) comparing that value to a reference biometric value for that user;
(c) predicting the type of transaction to be requested by said user;
(d) comparing the predicted transaction with the transaction actually requested by said user; and
(e) determining whether the user is valid, based upon the biometric value comparison and the result of comparing the predicted transaction with the actual transaction if said biometric value comparison is not conclusive.

29. The method of claim 28, also including the following additional steps:
(f) maintaining a suspicion count of suspicious transactions involving said user;
(g) establishing a maximum threshold number of suspicious transactions;
(h) comparing the number of suspicious transactions with the threshold number; and
(i) utilizing said comparison in the determination of whether the user is valid.

30. The method of claim 28, in which the step of determining whether the user is valid includes comparing the difference between the biometric value of the user and the reference biometric value with a threshold biometric value.

31. The method of claim 30, also including the step obtaining more information concerning the user when the difference between the biometric value of the user and the reference biometric value is close to the threshold biometric value and the transaction requested by the user is different than the predicted transaction.

32. The method of claim 31, in which the step of obtaining additional information includes obtaining a PIN number from the user.

33. The method of claim 29, also including the step of incrementing the suspicion count whenever it is determined in step (e) that the user is not valid.

34. The method of claim 33, also including the step of decrementing the suspicion count to zero whenever the user transaction is determined to be non-suspicious.

* * * * *

UNITED STATES PATENT AND TRADEMARK OFFICE
CERTIFICATE OF CORRECTION

PATENT NO. : 5,386,104
DATED : January 31, 1995
INVENTOR(S) : Iain R.F. Sime

It is certified that error appears in the above-indentified patent and that said Letters Patent is hereby corrected as shown below:

Column 8, line 11, insert --a-- before "transaction--.

Column 8, line 12, after "means" insert --to--.

Column 9, line 2, before "obtaining" insert --of--.

Signed and Sealed this

Twenty-eight Day of March, 1995

Attest:

BRUCE LEHMAN

*Attesting Officer*     *Commissioner of Patents and Trademarks*